United States Patent
Nussbaum

(10) Patent No.: US 11,428,952 B2
(45) Date of Patent: Aug. 30, 2022

(54) HOLOGRAPHIC DISPLAY DEVICE AND METHOD OF USE

(71) Applicant: Portl, Inc., Los Angeles, CA (US)

(72) Inventor: David Nussbaum, Glendale, CA (US)

(73) Assignee: Proto, Inc., Los Angeles, CA (US)

( * ) Notice: Subject to any disclaimer, the term of this patent is extended or adjusted under 35 U.S.C. 154(b) by 0 days.

(21) Appl. No.: 17/625,288

(22) PCT Filed: Dec. 4, 2020

(86) PCT No.: PCT/US2020/063423
§ 371 (c)(1),
(2) Date: Jan. 6, 2022

(87) PCT Pub. No.: WO2021/113719
PCT Pub. Date: Jun. 10, 2021

(65) Prior Publication Data
US 2022/0206315 A1    Jun. 30, 2022

Related U.S. Application Data

(60) Provisional application No. 62/944,546, filed on Dec. 6, 2019.

(51) Int. Cl.
*G02B 30/56* (2020.01)
*H04N 5/225* (2006.01)
*H04N 13/388* (2018.01)

(52) U.S. Cl.
CPC ........... *G02B 30/56* (2020.01); *H04N 5/2256* (2013.01); *H04N 13/388* (2018.05)

(58) Field of Classification Search
CPC .......... G02B 30/56; G02B 5/32; G02B 27/22; G02B 27/26; G02B 27/2278; G03H 1/04;
(Continued)

(56) References Cited

U.S. PATENT DOCUMENTS

| | | |
|---|---|---|
| 9,581,962 B1 | 2/2017 | Duffy |
| 2017/0278140 A1 | 9/2017 | Duffy |
| 2019/0227419 A1 | 7/2019 | McNelley et al. |

FOREIGN PATENT DOCUMENTS

| | | |
|---|---|---|
| CN | 208301373 U | 1/2019 |
| CN | 209248795 U | 8/2019 |

(Continued)

OTHER PUBLICATIONS

International Preliminary Examination Report of Parent PCT Application. dated Nov. 3, 2021.
(Continued)

*Primary Examiner* — Jie Lei
(74) *Attorney, Agent, or Firm* — Diament Patent Law, P.C.; Adam Diament

(57) ABSTRACT

A holographic display device for presenting a hologram-like image and a method of use are disclosed. The holographic display device includes a box-like structure, a translucent panel, and light panels extending the entire length of the box-like structure. The light panels position between the box-like structure and the translucent panel. The holographic display device includes a transparent monitor connecting the box-like structure at its front end. The transparent monitor receives and displays an image. The light panels illuminate light and the translucent panel diffuses, blends, and evenly distributes the light in the interior. Transmitted shadowing to the monitor provides a realistic appearance. A unique image capturing system for capturing the image to be displayed on the transparent monitor is also disclosed. The image capturing system transmits the image to the holographic display device in real-time or as a pre-recorded image using wired or wireless protocols.

18 Claims, 17 Drawing Sheets

(58) Field of Classification Search
CPC ...... G03H 1/0005; G03H 1/0891; G03H 1/26; G03H 1/0248; G03H 2001/0088; G09F 13/08; G09F 19/125; A63F 2250/302; H94N 13/388; H94N 5/2256; H04N 13/388; H04N 5/2256
USPC .......... 348/44, 51; 359/15, 32, 33, 478, 629, 359/443, 460, 462
See application file for complete search history.

(56) References Cited

FOREIGN PATENT DOCUMENTS

| | | |
|---|---|---|
| KR | 20170055073 A | 5/2017 |
| WO | 2009098797 A1 | 8/2009 |
| WO | 2018154458 A1 | 8/2018 |

OTHER PUBLICATIONS

"Third Party Observation" from corresponding regional stage application No. 20897224.0. Received from European Patent Office on May 13, 2022.

HOLOGRAPHIC DISPLAY DEVICE AND METHOD OF USE

CROSS REFERENCE TO RELATED APPLICATIONS

This Application is a U.S. National Stage filing under 35 U.S.C. § 371 of PCT Application No. PCT/US20/63423, filed on Dec. 4, 2020, entitled "Holographic Display Device and Method of Use," which claims benefit of U.S. Provisional Patent Application No. 62/944,546, filed on Dec. 6, 2019, entitled "Holographic Display Device and Method of Use," under 35 U.S.C. § 119. The contents of each are incorporated by reference in their entireties.

FIELD OF THE DISCLOSURE

The present invention relates to a holographic display device, and more specifically, to a holographic display device and methods of use for displaying a hologram-like image on a transparent monitor positioned at the front end of a three-dimensional interior lit display box.

BACKGROUND OF THE INVENTION

Holographic displays and holographic-like displays are used to present a realistic looking three-dimensional (3D) object on a two-dimensional (2D) surface. The use of a transparent liquid crystal display (LCD) screens within a boxlike structure is one way to make a realistic 3D image appear where the LCD screen is mounted. However, since an LED monitor can only present 2D images, and the image on the screen appears the same, regardless of which angle the image is viewed from (unlike spatial light modulators, where the image appears different from different angles).

Several methods utilizing the above-discussed techniques have been disclosed in the past. One such example is disclosed in a United States granted U.S. Pat. No. 9,581,962, entitled "Methods and systems for generating and using simulated 3D images" (the "'962 patent"). The '962 patent discloses a three-dimensional image simulation device for managing a live event comprising an image capturing device for capturing live captured data corresponding to a presenter and generating, in real-time, hologram data based on the live captured data. An output interface for broadcasting the hologram data in real-time to at least one additional location containing an audience, wherein the hologram data is used to create a hologram of the presenter at least one additional location based on an apparent parallax effect in a simulated three-dimensional display device, the hologram creating a three-dimensional illusion for the audience regarding the actual presence of the presenter at the at least one additional location. Furthermore, an input interface for receiving audience data from at least one additional location regarding the interaction between the hologram and the audience and a display device for displaying images based on audience data to the presenter.

Another example is disclosed in a South Korean Patent Publication No. 20170055073, entitled "Blended Display Apparatus" (the "'073 Publication"). The '073 Publication relates to a combination-type display device capable of displaying a combination-type display content in a display-advertisement content by using three-dimensional information wherein a hologram and an OLED transparent display are combined. The combination-type display device includes: a hologram front surface unit receiving an image for the hologram and an image for the display, forming the image for the hologram and thereafter reflecting the image to a front side, adjusting the brightness of a lamp or turning on/off the lamp according to lamp control signals; a display case unit having the hologram front surface unit on a front surface to enable a display subject to be shown in the hologram front surface unit through the front surface; and a control device unit storing the combination-type content wherein the image for the hologram and the image for the display are combined, separating the content into the image for the hologram and the image for the display and thereafter inputting the images to the hologram front surface unit, and generating the lamp control signals and thereafter inputting the lamp control signals to the hologram front surface unit.

Another example is disclosed in a PCT Publication No. 2018154458, entitled "Hologram Karaoke Jukebox" (the "'458 Publication"). The '458 Publication discloses a system that generates a holographic image of the celebrity who is also performing the song right next to the karaoke singer. The system enables remote/local audiences to perceive that the karaoke singer is performing a song next to and with the celebrity. The system can enable audience users to be able to access live/recorded events at the local location or anywhere around the world using smartphones, tablets, PCs, and TV monitors to watch the holographic performance and/or event. Processes can allow for local and worldwide viewing of local and worldwide events/contests to be held and where anyone can save the video and send it to a friend and/or vote for their favourite karaoke singer who may be in a contest.

Yet another example is disclosed in a Chinese granted patent No. 208301373, entitled "Holographic show cupboard" (the "'373 patent"). The '373 patent provides a holographic show cupboard, having the cabinet body, holographic projector, and holographically projected screen for projecting a holographic image.

Yet another example is disclosed in a Chinese granted patent No. 209248795, entitled "AR Interactive Holographic Whiteboard" (the "'795 patent"). The '795 patent discloses an AR interactive holographic whiteboard which comprises a shell, an AR transparent liquid crystal display screen, a holographic imaging reflector plate, and a 65-inch display screen. A display screen mounting part is arranged on the shell; mounting grooves are formed in the two adjacent end faces, corresponding to the display screen mounting part, of the shell. The AR transparent liquid crystal display screen is mounted in the mounting groove in one end surface; the 65-inch display screen is installed in the installation groove in the other end face, the holographic imaging reflector plate is obliquely arranged in the display screen installation part, the included angle between the holographic imaging reflector plate and the 65-inch display screen is 45 degrees, and the included angle between the AR transparent liquid crystal display screen and the 65-inch display screen ranges from 15 degrees to 75 degrees. The interactive mode of a traditional electronic whiteboard is broken through, AR augmented reality and holographic imaging technology are combined for holding, and the visual experience of a user is improved.

All patents, patent applications, and non-patent literature disclosed in the present application are incorporated by reference in their entireties, for all purposes. The above disclosures present a realistic 3D like the image on a two-dimensional surface. Still, there remains a continuing need for improved techniques to make transparent LCD holographic display devices look more realistic.

BRIEF SUMMARY OF THE PRESENT INVENTION

The present invention provides a new and improved holographic display device for displaying a hologram-like image on a transparent liquid crystal display (LCD) monitor/ screen. The following presents a summary of exemplary embodiments of the present invention in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter.

One element of the holographic display device provides a hologram-like image effect within a holographic display device when the right content i.e., image is presented on a transparent monitor. The holographic display device includes a box-like structure, a translucent panel i.e., diffuser, and light panels extending the entire length, or substantially the entire length, of the box-like structure. In one implementation, the light panels include light-emitting diode (LED) strips. The light panels position between the box-like structure and the translucent panel. In one preferred implementation, the light panels are positioned at the top, sides, and rear of the translucent panel. The holographic display device includes a transparent monitor connecting the box-like structure. The transparent monitor and the translucent panel form an interior for the box-like structure. In other words, the transparent monitor and the translucent panel form a box-like structure with the transparent monitor at its front. The translucent panel provides a translucent material made of acrylic or other composition capable of diffusing light in the interior.

In one aspect of the present invention, the transparent monitor receives and displays an image. The light panels illuminate light and the translucent panel diffuses, blends, and evenly distributes the light in the interior. The image displayed on the transparent monitor appears as a hologram-like image with a well-lit interior at the backdrop. In one example, the translucent panel encompasses soft and curved edges to create a seamless or continuous look making the interior a more realistic background without any seam or line or edge. This allows providing a much more realistic hologram effect when the image is displayed on the transparent monitor.

In another aspect of the present invention, the invention provides a monitor frame that encompasses the transparent monitor. The monitor frame recesses to control the viewing angle of the transparent monitor and helps to enhance the hologram effect of the image displayed on the transparent monitor.

In one aspect of the present invention, the invention provides the image capturing system for capturing the image to be displayed on the transparent monitor. The image capturing system includes a sheet made used commonly for cyclorama (cyc) materials (which may be a flexible fabric, paper, or even solid structures such as a wall). A platform is placed on the sheet which a subject e.g., a human being stands. The platform acts as a reflective floor and reflects the down/bottom portion of the subject. The image capturing system includes a light box to project light onto the subject. The light creates a shadow on the sheet and reflection from the platform of the subject. A camera captures the image of the subject, the shadow, and the reflection. Subsequently, the image capturing system transmits the image (with subject, shadow, and reflection) to the holographic display device. The holographic display device displays the image on the transparent monitor. The image displayed or presented on the transparent monitor appears as a hologram-like image with a well-lit interior creating maximum depth, dimension, and realistic effect for the image displayed on the transparent monitor.

In one aspect of the present invention, the image capturing system transmits the image to a data storage device, such as a universal serial bus (USB) stick, for example. The data storage device plugs to the holographic display device for presenting the image on the transparent monitor. In another aspect of the present invention, the image capturing system transmits the image to an electronic device, such as a mobile phone, for example. The electronic device transmits the image to the holographic display device for presenting the image on the transparent monitor. Alternatively, the image capturing system transmits the image in real-time using wired or wireless protocols.

In one aspect of the present invention, the holographic display device includes speakers connected to the box-like structure. The speakers output audio signals when the image is displayed on the transparent monitor to present an interactive experience. The holographic display device further includes a camera (still or video camera) mounted at the top. The camera helps to capture its field of view (audiences and their movements) and sends back the feed to the image capturing system for live interaction with the subject. This allows the subject to have a telepresence effect. In one example, the image capturing system provides a feed reference monitor to show the images or video captured by the camera mounted at the holographic display device to enhance the realistic interactive experience for the subject and audiences.

Additional features and advantages of the invention hereof will become more apparent in light of the following detailed description of selected embodiments, as illustrated in the accompanying Figures. As will be realised, the invention disclosed is capable of modifications in various respects, all without departing from the scope of the invention. Accordingly, the drawings and the description are to be regarded as illustrative in nature.

BRIEF DESCRIPTION OF THE DRAWINGS

The present invention will now be described in detail with reference to the drawings, which are provided as illustrative examples of the invention as to enable those skilled in the art to practice the invention. It will be noted that throughout the appended drawings, like features are identified by like reference numerals. Notably, the Figures and examples are not meant to limit the scope of the present invention to a single embodiment, but other embodiments are possible by way of interchange of some or all of the described or illustrated elements and, further, wherein.

DETAILED DESCRIPTION OF EMBODIMENTS

Figure 1:
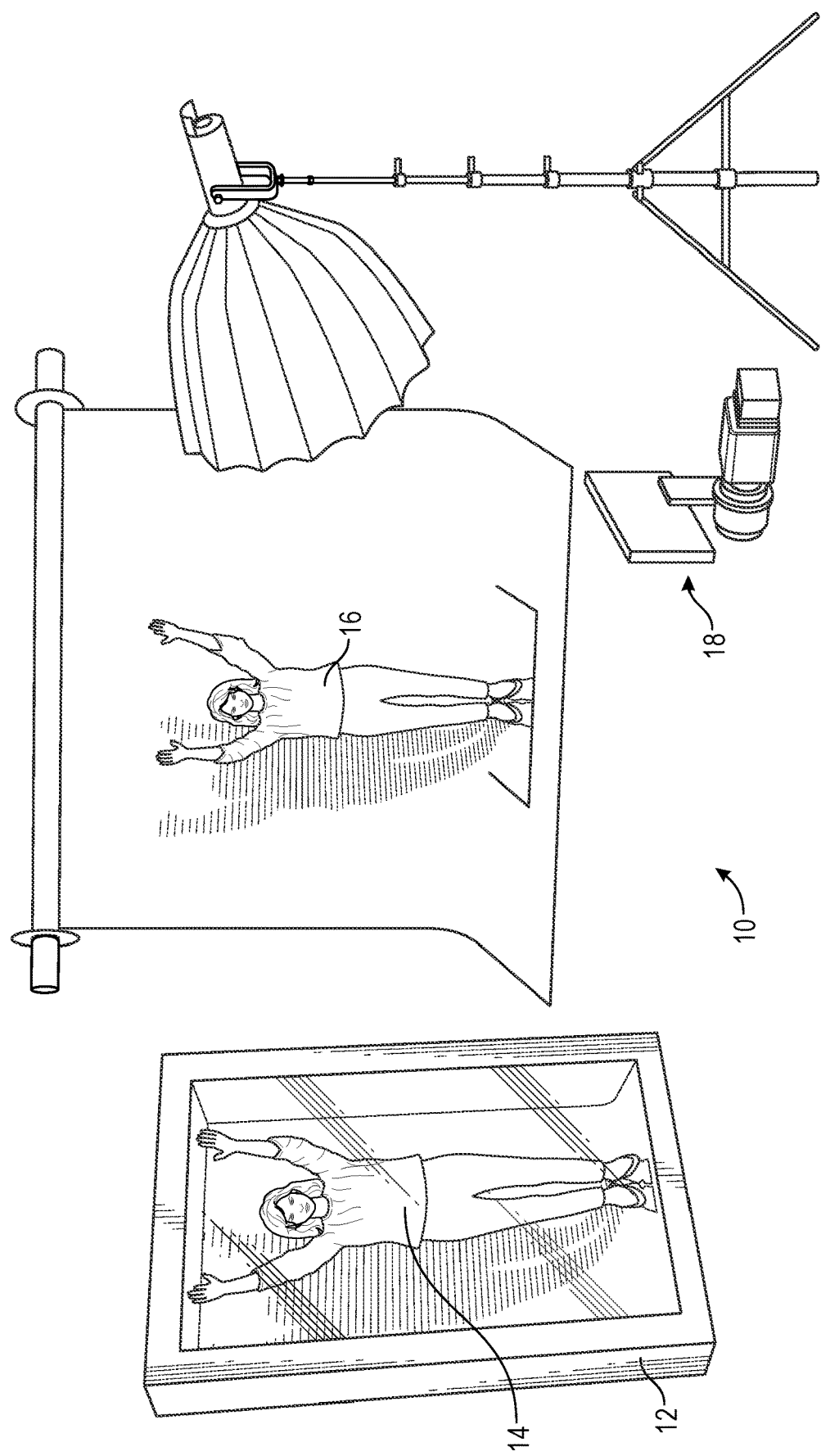
FIG. 1 is an environment of a holographic display device presenting a hologram-like image of a subject captured using an image capturing system, in accordance with one exemplary embodiment of the present invention.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers, and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealised or overly formal sense unless expressly so defined herein.

Exemplary embodiments of the present invention are described herein with reference to idealised embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

Turning to the Figures, FIG. 1 shows environment 10 in which holographic display device 12 displays or presents hologram-like image 14 of subject 16 such as a human being captured using image capturing system 18, in accordance with one exemplary embodiment of the present invention.

Figure 2:
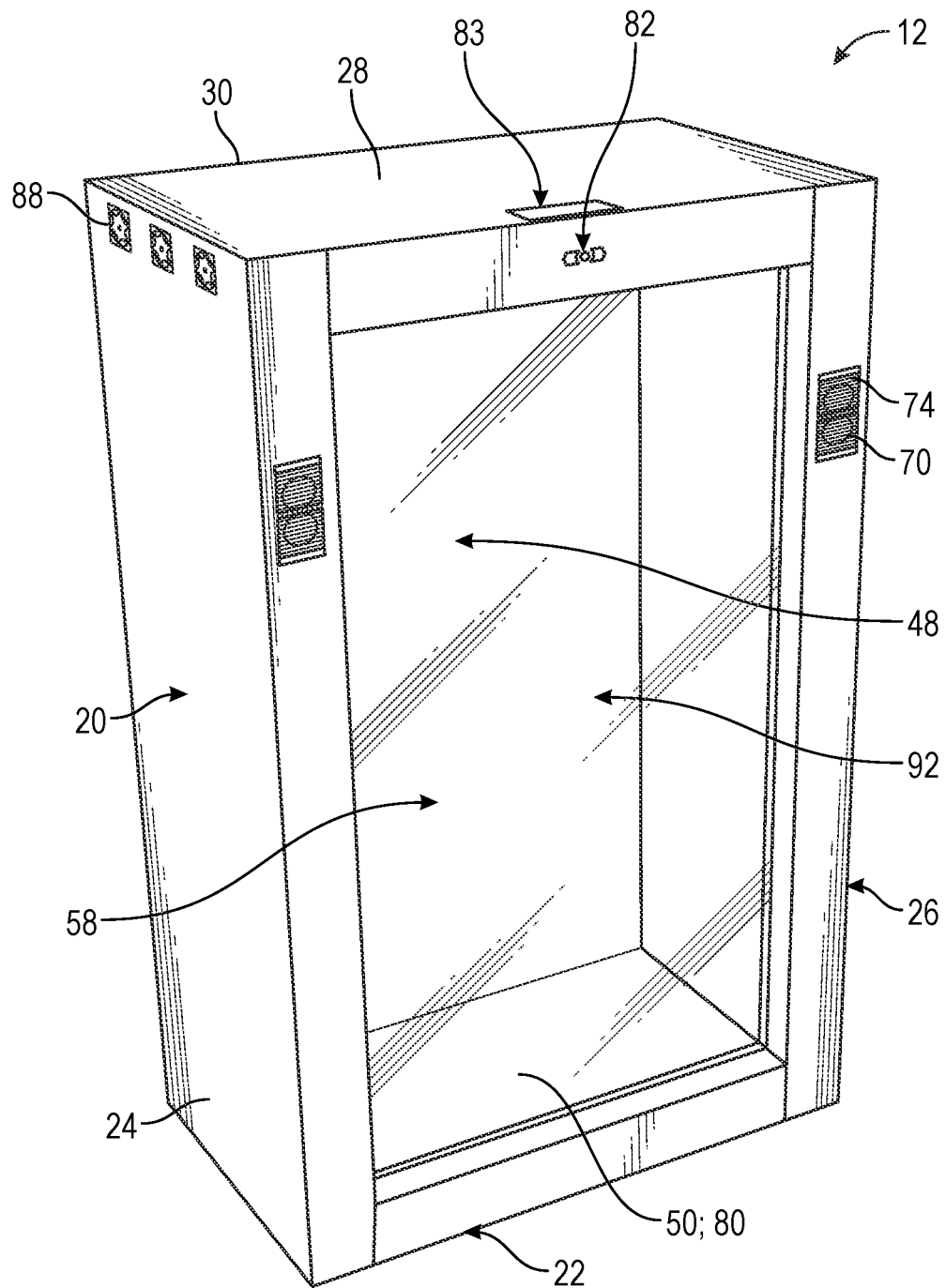
FIG. 2 and FIG. 3 depict a perspective view and an exploded view, respectively of the holographic display device, in accordance with one embodiment of the present invention.
Figure 3:
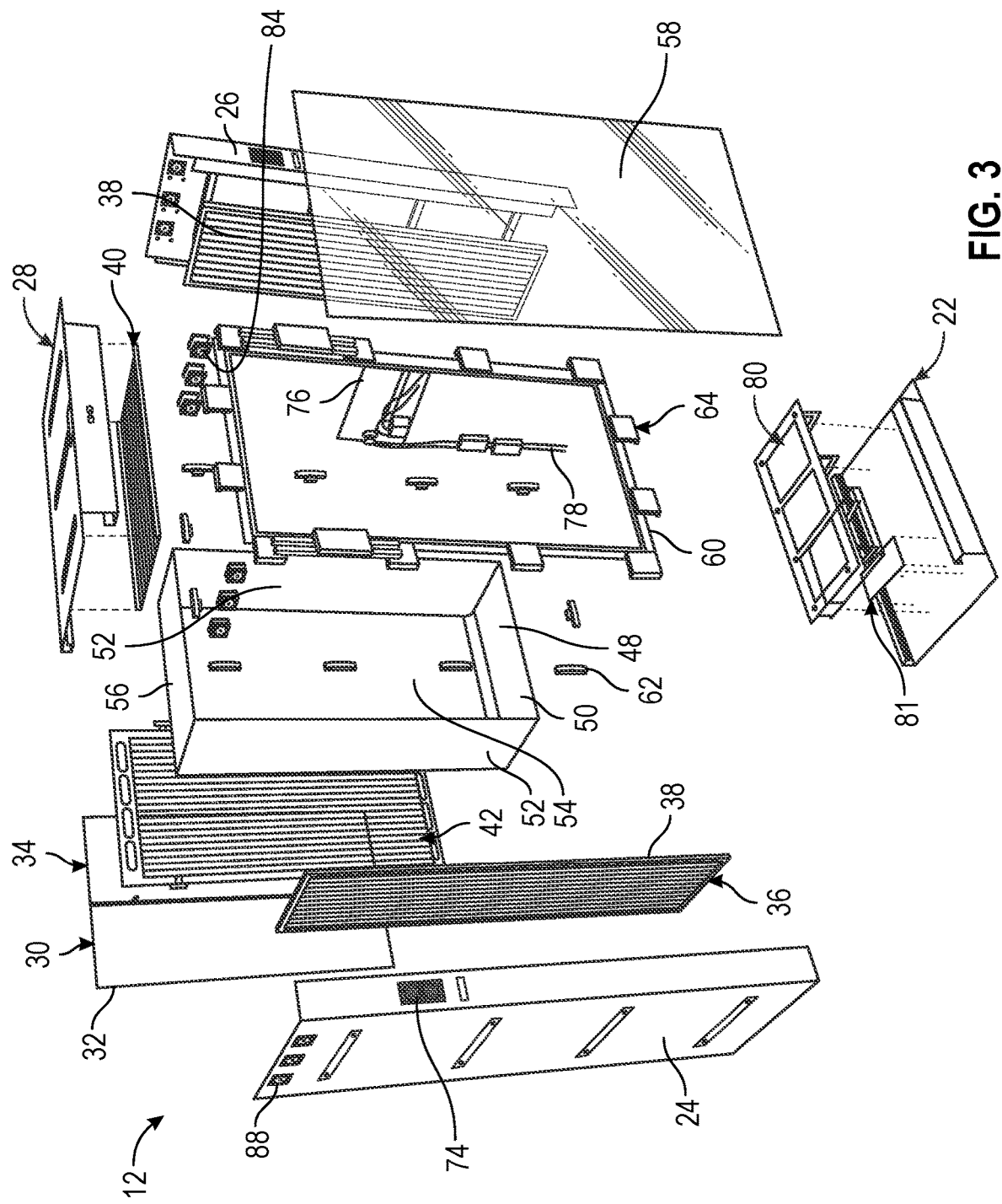

FIG. 2 and FIG. 3 depict a perspective view and an exploded view, respectively of holographic display device 12, in accordance with one embodiment of the present invention. Holographic display device 12 provides container or box or housing or box-like structure 20. In one example, box 20 comes in a rectangular shape/configuration. However, a person skilled in the art appreciates that box 20 may come in other shapes say square shape, for example. Box 20 is big enough e.g., 6 to 7-foot-tall, 3-foot-wide, and 1 to 2-foot-deep (i.e., depth) to showcase or present a hologram-like image of a full-sized adult. However, a person skilled in the art appreciates that box 20 may come in different shapes and sizes.

Box 20 presents bottom frame 22, first side frame 24, second side frame 26, top frame 28, and rear frame 30. Each of bottom frame 22, first side frame 24, second side frame 26, and top frame 28 provides an L-shaped frame made of metal, hard plastic, or any other suitable material. First side fame 24 indicates a left side frame and second side frame 26 indicates a right-side frame. Here, rear frame 30 includes two door frames i.e., first door frame 32 and second door frame 34. First door frame 32 and second door frame 34 operate similar to two-door mechanisms known in the art. First door frame 32 and second door frame 34 facilitate access to electrical/electronic components. Bottom frame 22, first side frame 24, second side frame 26, top frame 28 and rear frame 30 connect with the help of fasteners or welding or any other known mechanism. As specified above, box 20 comes in a rectangular configuration. In one example, box 20 is portable and stands vertically. In one example, box 20 rests on a trolley or metal caddy (not shown) with wheels and casters. The metal caddy allows box 20 to transport easily from one location to another.

Figure 4:
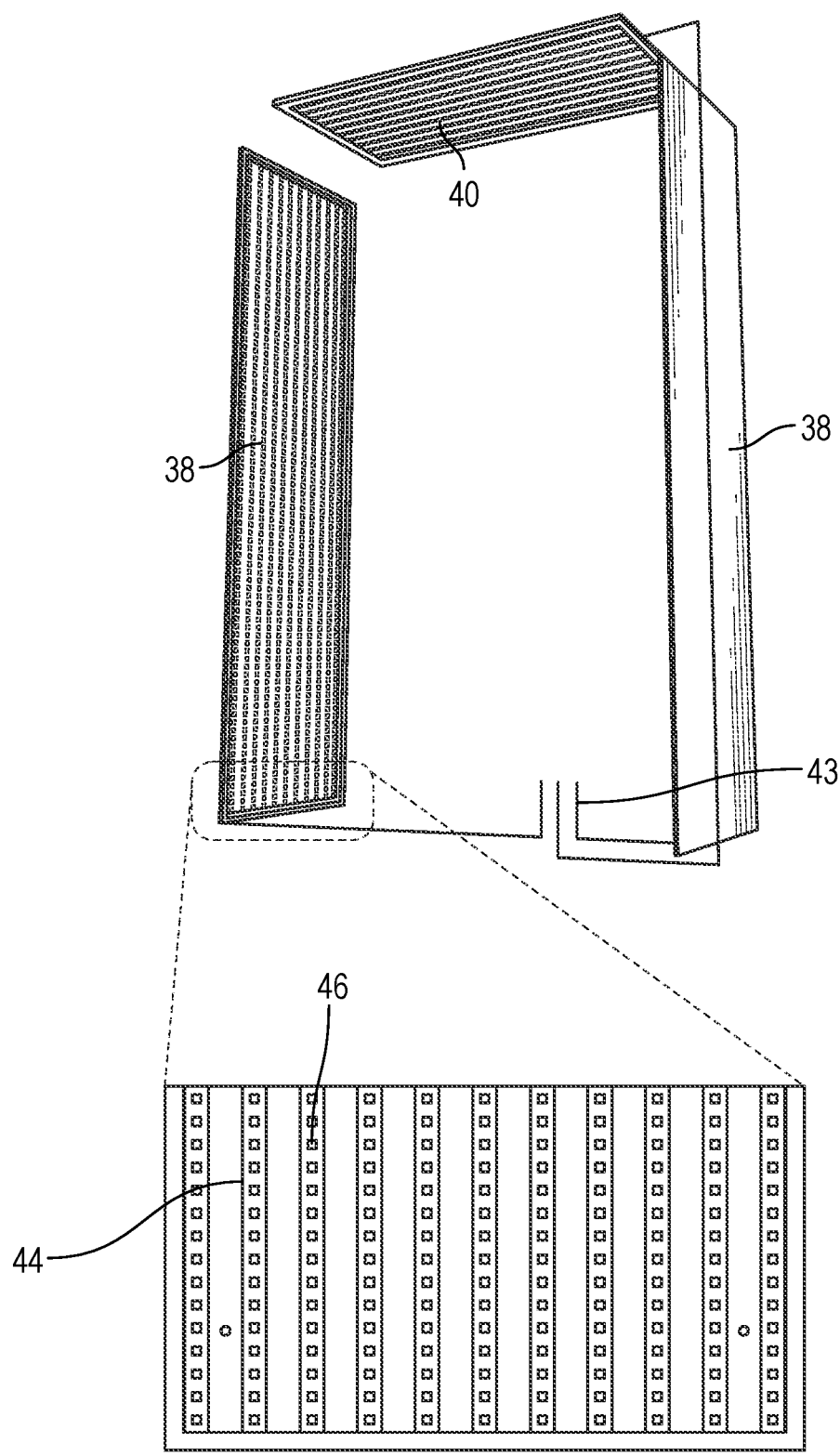
FIG. 4 shows a feature of light panels connecting via plug connectors.

Box 20 encompasses light panels 36. Light panels 36 include light-emitting diode (LED) panels. Light panels 36 extend approximately the entire length of box 20. In one implementation, light panels 36 includes side light panels 38, top light panel 40, and rear light panel 42. Here, side light panels 38 connect in proximity to first side frame 24, second side frame 26. Top light panel 40 connects in proximity to top frame 28. Rear light panel 42 connects in proximity to rear frame 30. FIG. 4 shows a feature of side light panels 38 and top light panel 40 connecting via plug connectors 43. Each of light panels 36 provides approximately eleven LED strips 44 spaced apart at about 1¼" from one another. Each LED strip 44 provides a series of surface mounted light-emitting diodes (LEDs) 46. A person skilled in the art appreciates each of the light panels 36 may have more or less than 11 LED strips 44 spaced apart at an equal or varied distance from one another. The number of LED strips 44 and their spacing depends on the size of box 20 and the amount of light needed to illuminate the interior of box 20. In one example, LEDs 46 provide 8000 colour temperature at 60 lumens per foot to brightly lit the interior of box 20.

Further, box 20 provides translucent panel 48. Translucent panel 48 provides a translucent material made of acrylic or other composition capable of diffusing the light within box 20. In other words, translucent panel 48 provides an acrylic layer and acts as a light translucent panel. Here, light panels 36 position between box 20 (i.e., outer casing) and translucent panel 48. In one implementation, translucent panel 48 has a milky white colour and extends over the entire length of box 20 and/or light panels 36. A person skilled in the art understands that colour and dimensions of the translucent panel may vary depending on the need. Translucent panel 48 includes bottom translucent panel 50, side translucent panels 52, rear translucent panel 54, and top translucent panel 56. In operation, translucent panel 48 helps to diffuse, blend, and evenly distribute the high luminosity produced by light panels 36.

Figure 5:
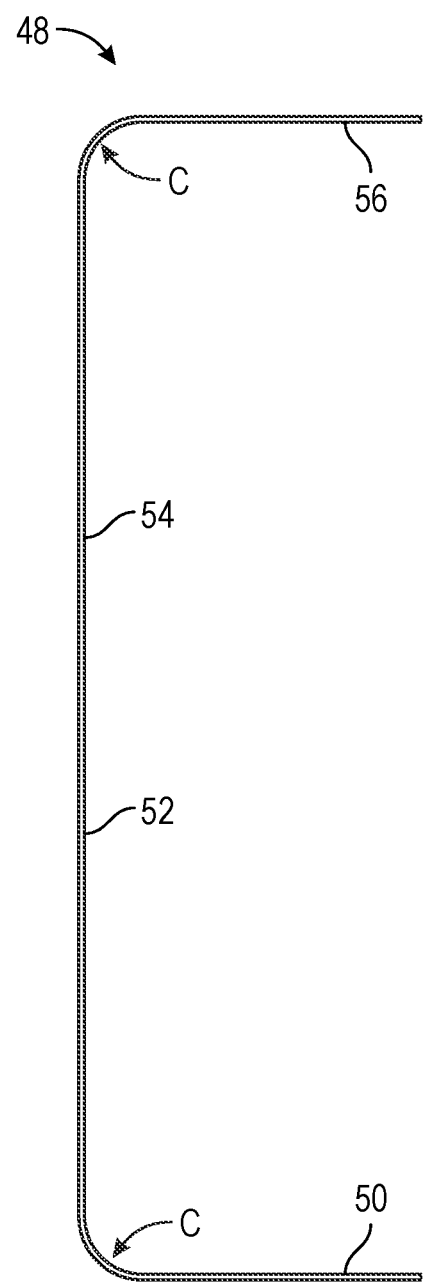
FIG. 5 shows a side view of a translucent panel having curvature or curved edges.

FIG. 3 shows an exemplary translucent panel 48, in accordance with one embodiment of the present invention. Here, bottom translucent panel 50 and top translucent panel 56 position parallelly to each other, and perpendicularly to side translucent panels 52. Rear translucent panel 54 positions perpendicularly to side translucent panels 52, and bottom translucent panel 50 and top translucent panel 56. In one example, edges of bottom translucent panel 50, side translucent panels 52, rear translucent panel 54 and top translucent panel 56 connect at 90 degrees (right angle having visible seams). In another example, edges of bottom translucent panel 50, side translucent panels 52, rear translucent panel 54, and top translucent panel 56 have a curvature or inclination C say between 5 to 30 degrees (radius). A person skilled in the art appreciates that edges of bottom translucent panel 50, side translucent panels 52, rear translucent panel 54, and top translucent panel 56 may have curvature C more or less than 5 to 30 degrees and such implementation falls with the scope of the presently disclosed holographic display device 12. FIG. 5 shows a side of translucent panel 48 bottom translucent panel 50, rear translucent panel 54, and top translucent panel 56 provided at 4" radius, in accordance with one exemplary embodiment of the present invention. Curvature C at the edges of translucent panel 48 provides a more realistic appearance of subject 16 moving forward and back within box 20 when hologram-like image 14 is displayed on transparent monitor 58. In the present invention, transparent monitor 58 indicates a display or screen or display screen, or touch screen display, etc and connecting box 20. Transparent monitor 58 mounts to box 20 at its front end, as shown in FIG. 2. Transparent monitor 58 includes a liquid crystal display (LCD) screen known in the art. Further, transparent monitor 58 includes display devices such as LCD, plasma, LED, OLED, and the like without departing from the scope of the present invention. In one example, transparent monitor 58 presents a flat panel display that is parallel to rear frame 30 or rear translucent panel 54. In another example, transparent monitor 58 presents a curved panel display that extends outward or inward from box 20 (i.e., rear frame 30 or rear translucent panel 54).

Figure 6:
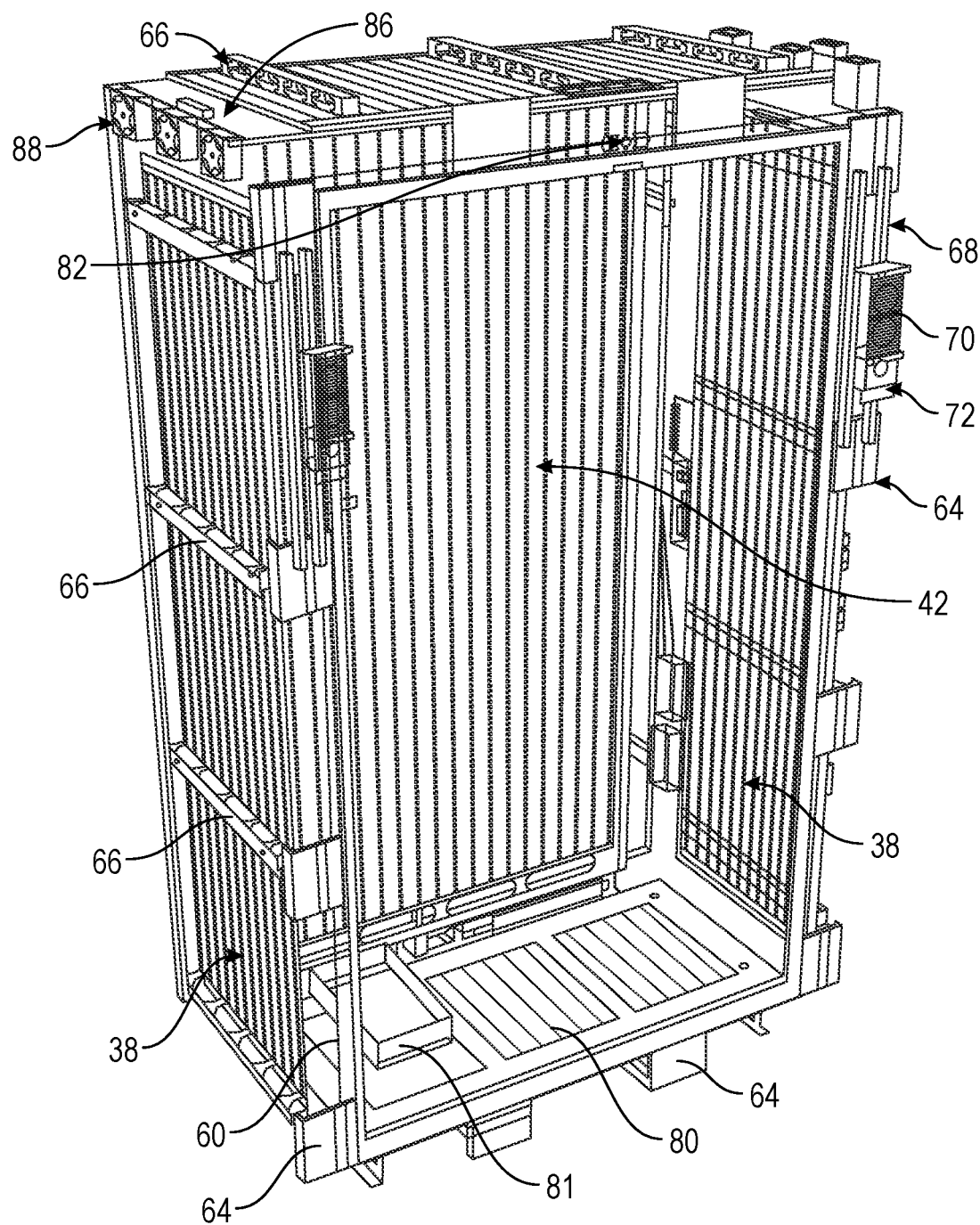
FIG. 6 shows a feature of a monitor frame surrounding a transparent monitor.

In one implementation, transparent monitor 58 encompasses in monitor frame or bezel 60. In other words, monitor frame 60 surrounds or mounts around transparent monitor 58. In one implementation, transparent monitor 58 has 4K resolution for displaying clear hologram-like image 14 of subject 16. Further, transparent monitor 58 measures 86 inches diagonally. A person skilled in the art understands that transparent monitor 58 measures more or less than 86" inches and such measurement depend on the need. In one example, transparent monitor 58 mounts to monitor frame 60 via monitor brackets 62. Further, box 20 includes L-shaped brackets 64. FIGS. 3 and 6 show L-shaped brackets 64 connecting monitor frame 60 to box 20 and/or light panels 36 via elongated connectors 66. In addition, monitor frame 60 presents speaker brackets 68 for connecting speakers or audio outputs 70. Speaker brackets 68 present an L-shaped bracket 72 to connect speakers 70. In one preferred embodiment, speakers 70 mount at approximately 5 feet from the ground. Mounting speakers 70 at a suitable height allows to present voice of subject 16 in a realistic manner when hologram-like image 14 of subject 16 is displayed on transparent monitor 58. As presented above, first side frame 24 and second side frame 26 include an L-shaped frame. Here, each of first side frame 24 and second side frame 26 includes speaker receiving section 74 for aligning with speakers 70.

In one embodiment, transparent monitor 58 includes panel 76 for connecting electrical/electronic components via cables 78 to draw power and input to display hologram-like image 14 on transparent monitor 58.

Figure 7:
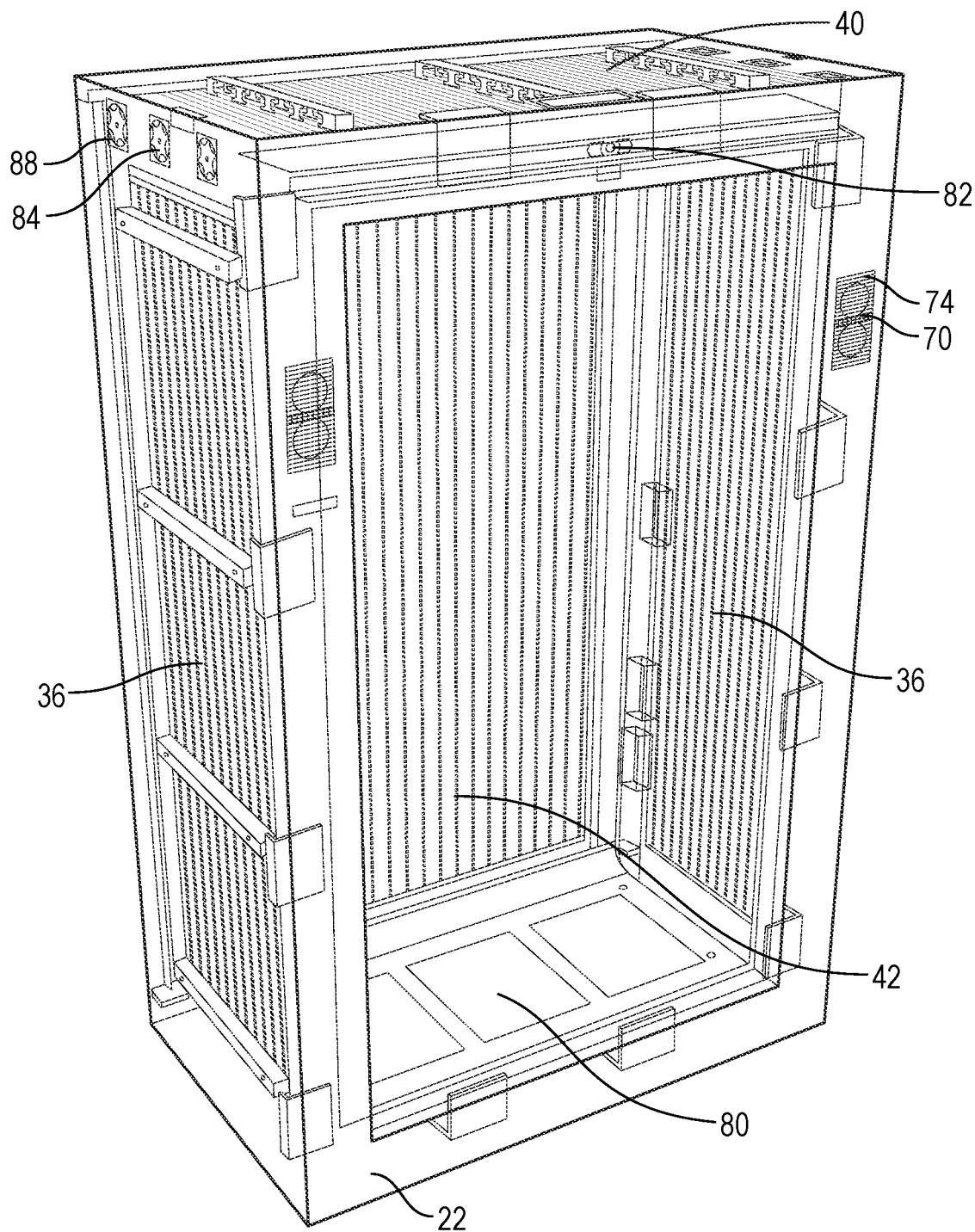
FIG. 7 shows a feature of a deck connecting a box-like structure of the holographic display device at the bottom.

Further, box 20 encompasses deck 80 placed between bottom frame 22 and bottom translucent panel 50. In one implementation, deck 80 presents power supply mounting plate 81 for supplying power to Light panels 36 via plug connectors 43. FIGS. 3, 6, and 7 show the feature of deck 80 mounted to bottom frame 22.

In addition, box 20 includes first camera 82 at top frame 28. Top frame 28 encompasses camera mounting plate 83 for placing first camera 82. The present invention shows mounting first camera 82 at top frame 28, however, a person skilled in the art appreciates that first camera 82 may be placed at any other position facing the front portion of box 20. Providing first camera 82 at top frame 28 allows to capture a field of view of box 20. For example, when holographic display device 12 is used for interacting with the audience, first camera 82 captures actions or movements of the audience in front of box 20 and allows to transmit the data for providing the telepresence effect. Further, box 20 includes fans 84 that mount to first side frame 24 and second side frame 26 via fan brackets 86. In one example, first side frame 24 and second side frame 26 include fan receiving sections 88 that align with fans 84. Fans 84 help to protect holographic display device 12 and keep exterior cool allowing human beings to touch from outside i.e., box 20 when holographic display device 12 is in use. Fans 84 blowout hot air generated by light panels 36 through fan receiving sections 88 and/or vents 90 (FIG. 10) placed at the top and bottom of box 20.

In accordance with the present invention, translucent panel 48 i.e., bottom translucent panel 50, side translucent panels 52, rear translucent panel 54 and top translucent panel 56 together with transparent monitor 58 at the front provides an interior or opening or hollow portion 92 within box 20. Here, the positioning of light panels 36 at the top, side, and rear enable interior 92 to be fully lit. In use, translucent panel 48 (together with light panels 36) covering the rear, sides, top and bottom and transparent monitor 58 covering the front end form a three-dimensional (3D) interior lit display box.

Figure 8:
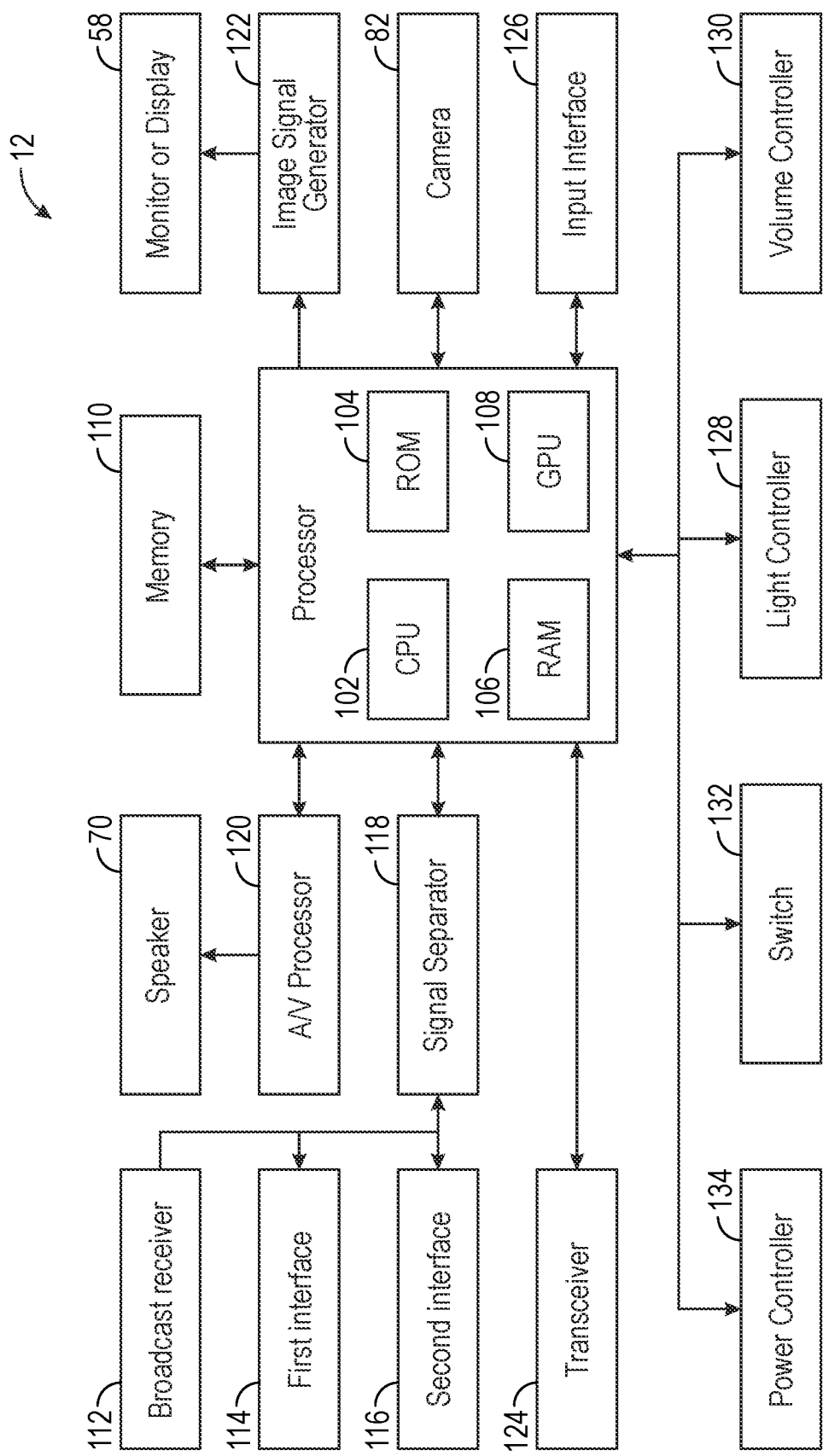
FIG. 8 is a block diagram of electrical/electronic components of the holographic display device.

FIG. 8 shows a block diagram of holographic display device 12 consisting of electric/electronic components. Holographic display device 12 includes processor 100 for controlling operations of holographic display device 12. In one example, processor 110 includes central processing unit (CPU) 102, read-only memory (ROM) 104, random-access memory (RAM) 106, and graphic processing unit (GPU) 108 connected via a bus (not shown). CPU 102 accesses memory 110 that stores program instructions and data for controlling holographic display device 12. Memory 110 implements as a hard disk, a non-volatile memory, or a volatile memory. CPU 102 also performs various operations by using various types of programs, contents, data, and the like stored in memory 110. ROM 106 stores a command set, and the like for booting holographic display device 12. Upon booting, GPU 108 generates a screen that includes various objects such as an icon, an image, a text, and the like.

Holographic display device 12 includes broadcast receiver 112, first interface 114, second interface 116, signal separator 118, an audio/video (A/V) processor 120, an image signal generator 122, communication interface or transceiver 124, an input interface 126, light controller 128, volume controller 130 and switch 132. In addition, processor 102 communicatively connects to transparent monitor 58, speakers 70, and first camera 82.

In one example, broadcast receiver 112 receives a broadcasting signal in a wired or wireless manner from a broadcasting station or a satellite and demodulates the received broadcasting signal. Broadcast receiver 112 receives a transmission stream via an antenna or a cable, demodulates it, and output a digital transmission stream signal. Alternatively, processor 102 receives an image and/or audio and video signal via first interface 114 and/or second interface 116. Here, first interface 114 includes a universal serial bus (USB) interface. Second interface 116 interface a high definition multimedia interface (HDMI) interface. A person skilled in the art appreciates that first interface 114 and second interface 116 may include any other interfaces that are known in the art.

Signal separator 118 divides a transmission stream signal provided from one of broadcast receiver 112, first interface 114, and second interface 116 into an image signal, an audio signal, and an additional information signal. Further, signal separator 118 transmits the image signal and the audio signal to A/V processor 120. A/V processor 120 performs signal processing, such as video decoding, video scaling, and audio decoding, with respect to the video signal and the audio signal that is given as input from broadcast receiver 112, first interface 114, and second interface 116. In addition, A/V processor 120 outputs the image signal to image signal provider 122 and outputs the audio signal to speaker 70.

Image signal provider 122 provides an image signal corresponding to an image received in the broadcast signal to transparent monitor 58. Transparent monitor 58 displays various information provided from image signal provider 160.

Transceiver 124 communicates with various kinds of external devices in various communication methods. Transceiver 124 includes a Wi-Fi chip, a cellular chip (SIM card), and/or a Bluetooth chip. In one exemplary implementation, transceiver 124 includes a USB port (similar to first interface 114) to which a USB connector is connected, various external input ports for connecting various external terminals such as a LAN, and a Digital Multimedia Broadcasting (DMB) chip that receives and processes a DMB signal.

Input interface 126 includes a touch screen, touch pad, key button, keypad, a remote controller, and the like to allow a user manipulation of transparent monitor 58 and/or holographic display device 12 itself.

Figure 9:
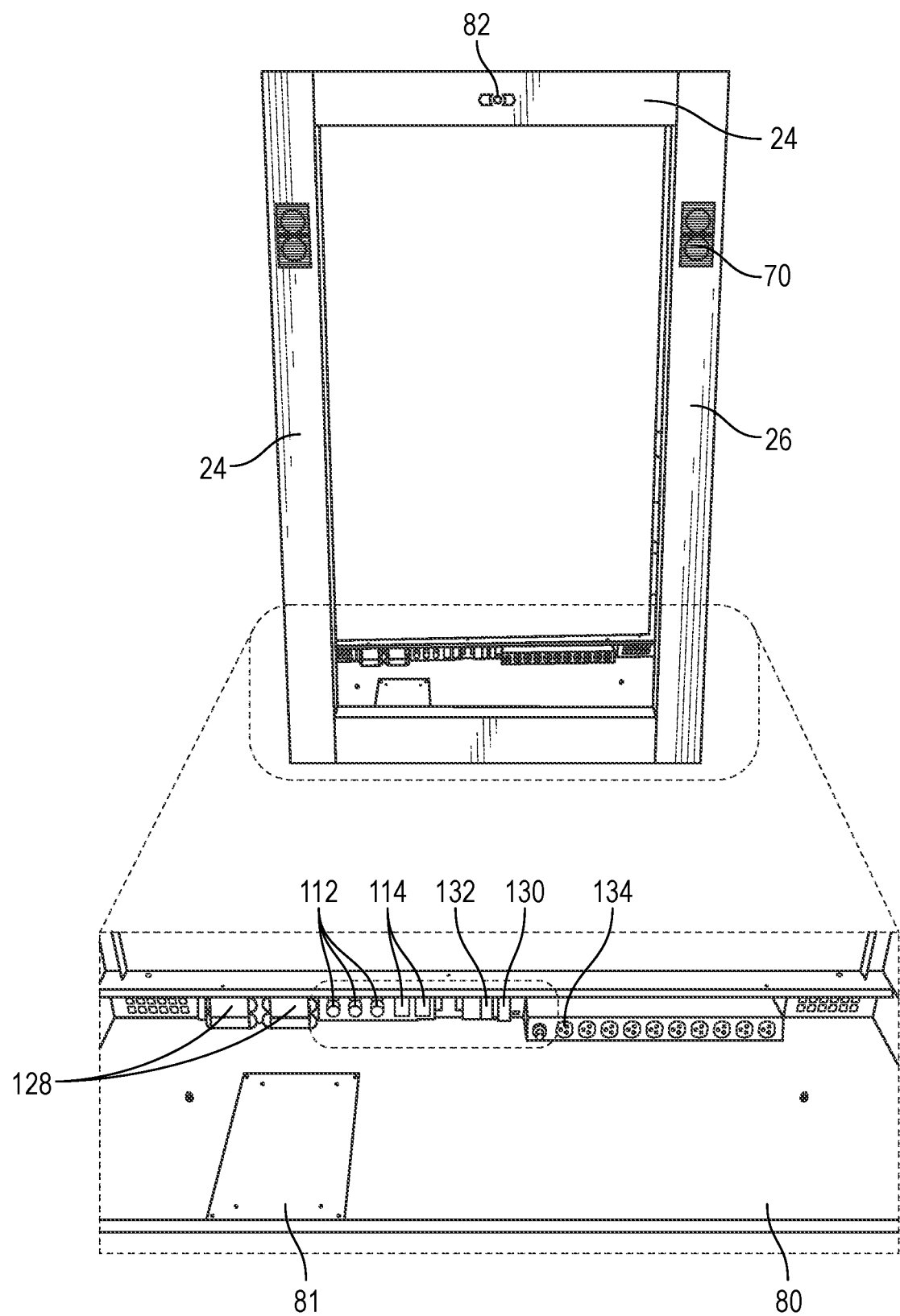
FIG. 9 and FIG. 10 show electronic components of the holographic display device.
Figure 10:
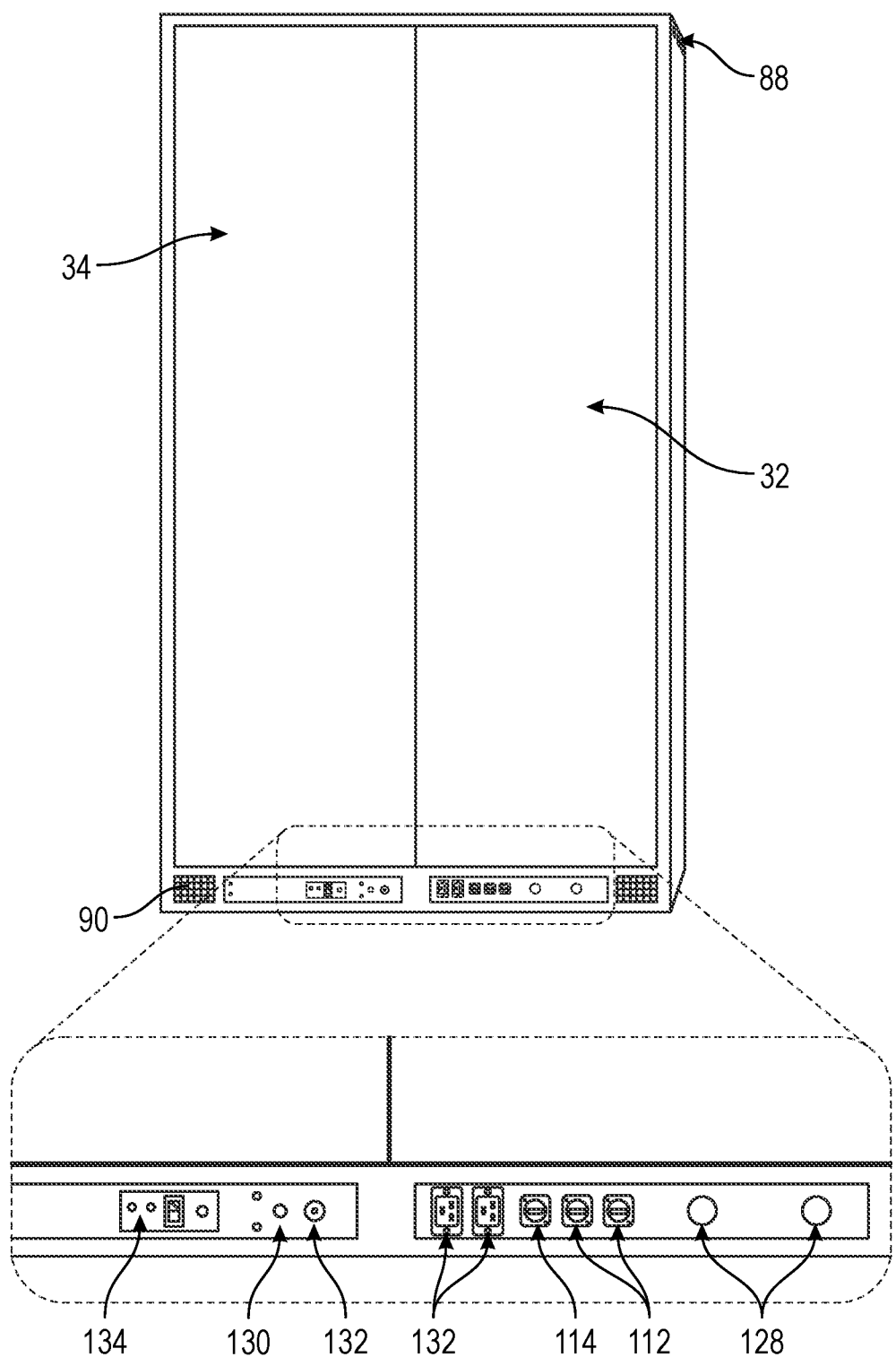

Light controller 128 includes a software or hardware toggle to control illumination or dimming of LED strips 44. Volume controller 130 includes software or hardware toggle/button to control volume outputted via speakers 70. Switch 132 includes software or hardware toggle/button for switching ON/OFF LED strips 44, transparent monitor 58, or any other component including holographic display device 12. FIG. 9 and FIG. 10 show an exemplary first interface 114, second interface 116, light controller 128, volume controller 130, and switch 132 positioned at the bottom of box 20.

Figure 11:
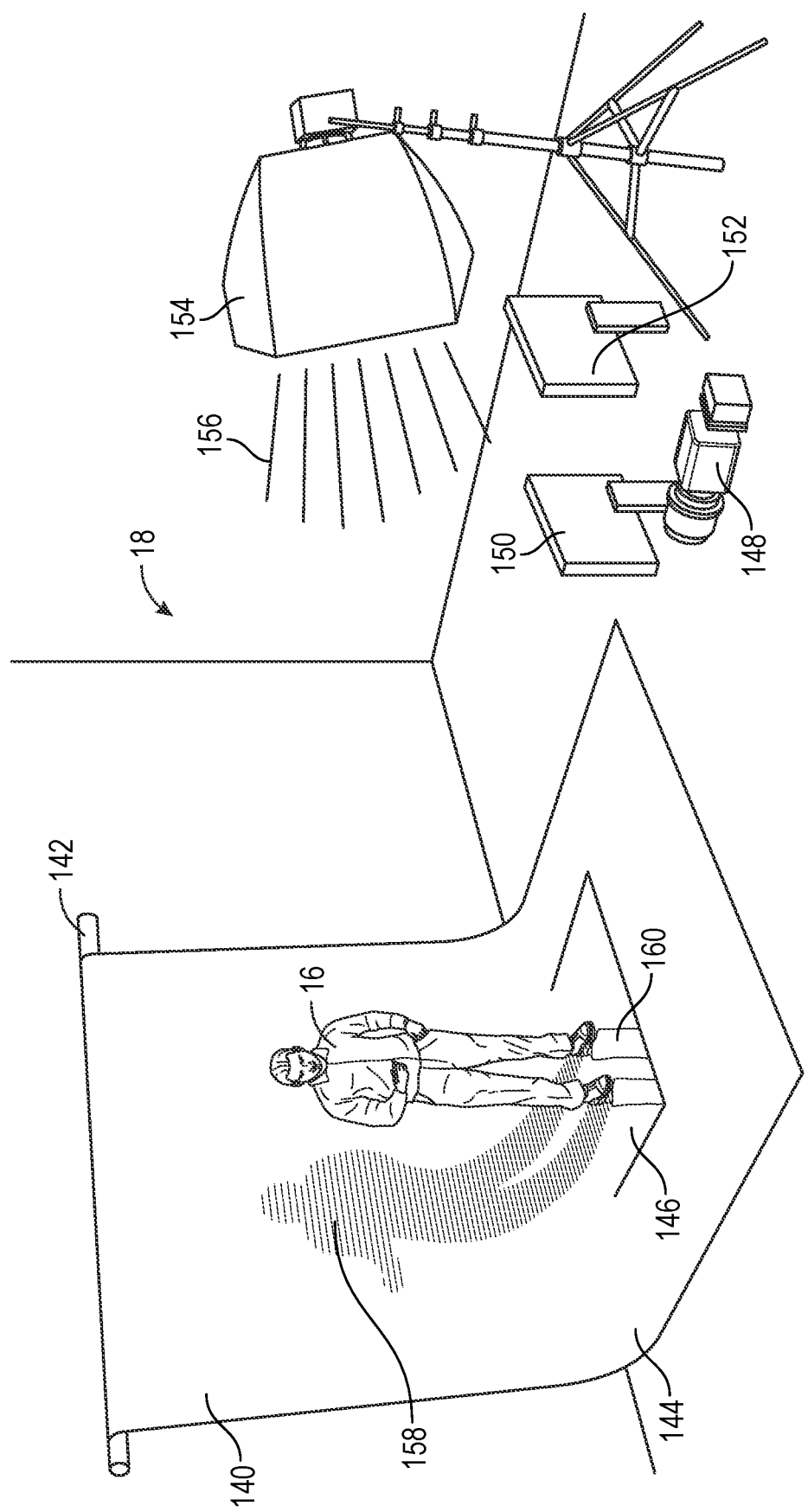
FIG. 11 and FIG. 12 show a perspective and a side view, respectively of a set-up of the image capturing system for capturing an image or video of the subject to present on the transparent monitor of the holographic display device.
Figure 12:
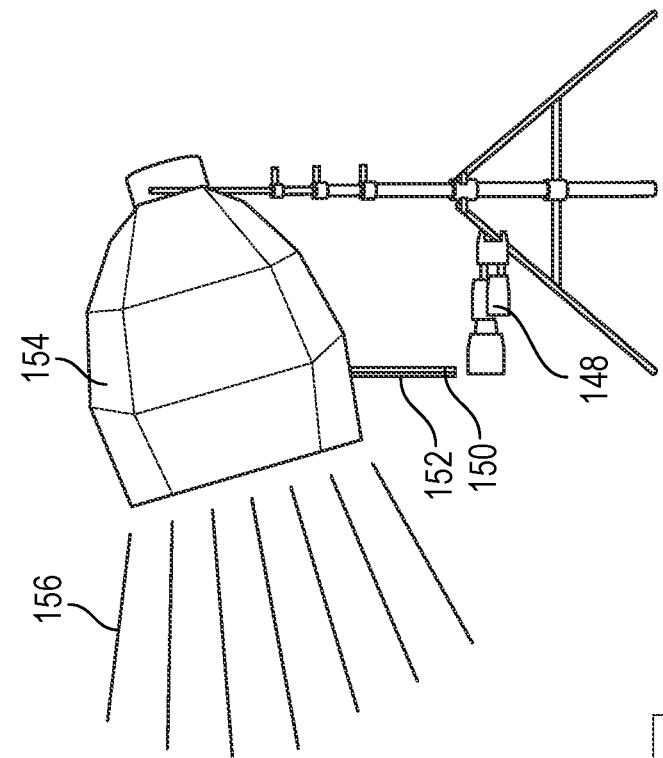
Figure 12:
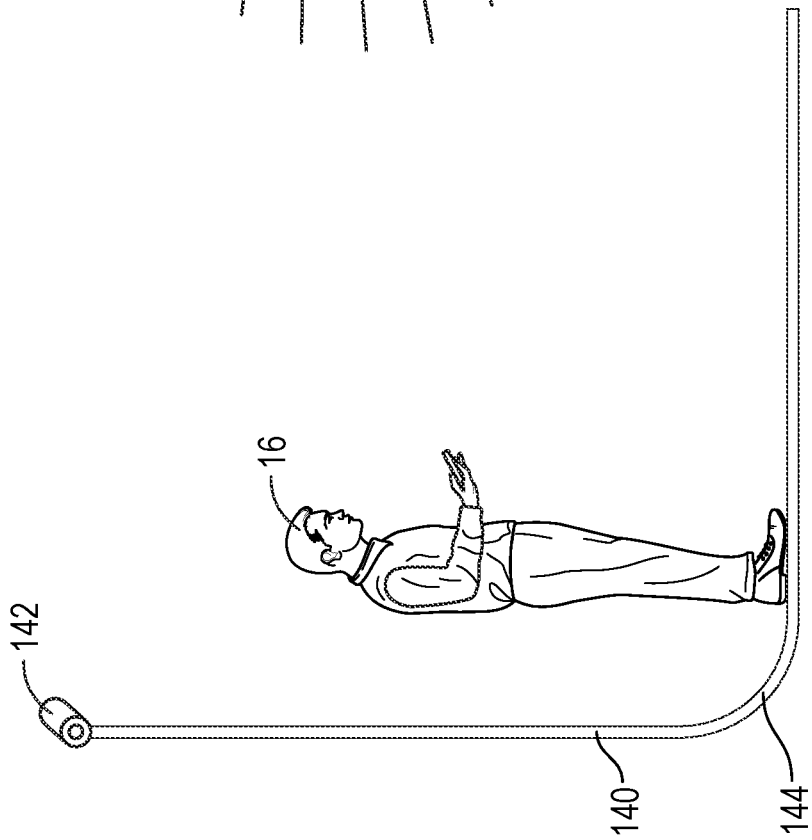

FIGS. 11 and 12 show a perspective and side view of a set-up of image capturing system 18 for capturing or recording an image or video of subject 16 such as a human being to present or display hologram-like image 14 of subject 16 at transparent monitor 58 (e.g., FIG. 1), in accordance with one exemplary embodiment of the present invention. Image capturing system 18 includes sheet or sheet roll 140 mounted to frame or pole 142. In other words, sheet 140 suspends from frame 142. Sheet 140 provides a material made of cyclorama (cyc) material. Here, sheet 140 acts as a white or natural seamless flat muslin panel to help create a scene for subject 16 to record image or video. In the current embodiment, sheet 140 suspends from frame 142 and seamlessly extends over the surface such as ground creating curvature 144. Curvature 144 provides a smooth or continuous effect for sheet 140. Upon the sheet 140 presents platform or stage 146 upon which subject 16 positions/stands to record image or video. Platform 146 presents a reflective floor made of clear plexiglass or acrylic material having an area of approximately 2'×4', for example. As platform 146 provides a reflective floor, the subject's image/shape presents reflection 160 of the bottom portion of subject 16 (FIG. 11). In one example, consider subject 16 is a human being. Here, the person stands on platform 16 for recording his image or video for presenting it as hologram-like image 14 on transparent monitor 58. In another example, consider subject 16 as a physical product say a shoe. Here, the shoe rests on platform 146 for recording its image or video (covering shape) for presenting it as hologram-like image 14 on transparent monitor 58.

Figure 13:
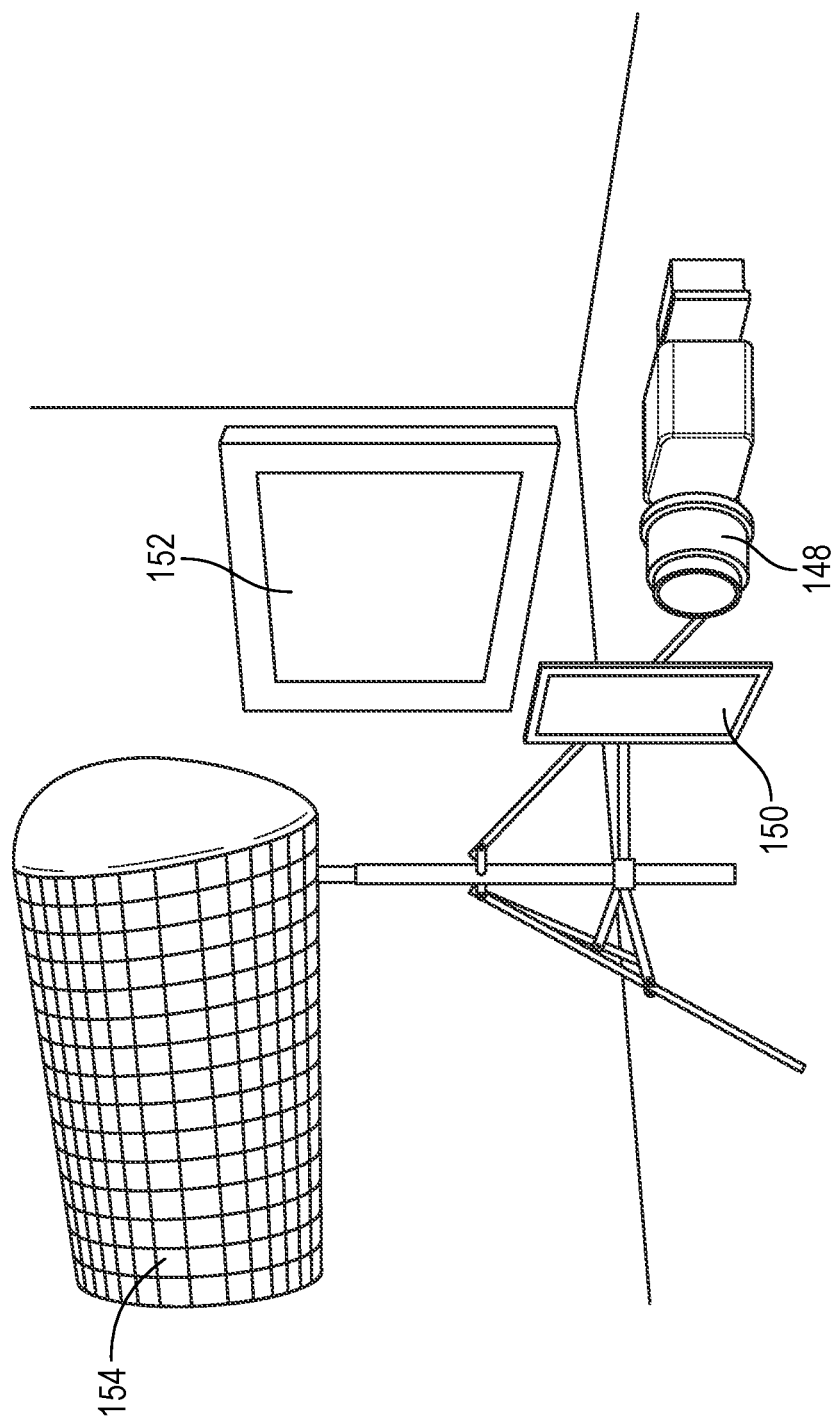
FIG. 13 shows an exemplary set-up of the image capturing system having a camera, a reference monitor, a feed reference monitor, and a light box, in accordance with one exemplary embodiment of the present invention.

Image capturing system 18 presents second camera or image capturing sensor 148 for capturing still images or video of subject 16. Second camera 148 encompasses a suitable lens set up to create a vertical or horizontal image to capture every detail image of subject 16. Second camera 148 is set up to capture images in vertical or horizontal frames depending on the orientation of hologram-like image 14 that needs to be displayed on transparent monitor 58. Second camera 148 positions at approximately 2 feet high from the surface i.e., ground to capture subject 16. Second camera 148 adjusts to avoid hologram-like image 14 appearing to float or leaning backward when displayed on transparent monitor 58. In one exemplary embodiment, image capturing system 18 provides a sound recorder (not shown) for recording voice or sounds made by subject 16 while capturing a video. This helps to record video and audio simultaneously and transmit to holographic display device 12 for playing video via transparent monitor 58 and audio via speakers 70. Image capturing system 18 presents reference monitor 150 configured to display still image or video captured by second camera 148 in real-time. For example, consider subject 16 is a human being presenting a lecture. Here, second camera 148 captures his actions or movements and transmits signals to reference monitor 150 for displaying his actions in real-time. In other words, reference monitor 150 shows subject 16 where it or he is in relation to a frame. This helps him to correct or adjust his posture. Additionally, image capturing system 18 presents feed reference monitor 152 configured to display images or video (i.e., its field of view) captured by first camera 82 of holographic display device 12. Considering the above example, subject 16 i.e., the presenter gets to see on feed reference monitor 152 how audiences are reacting to his lecture/actions/movements being displayed as hologram-like image 14 on transparent monitor 58. In other words, feed reference monitor 152 acts as a display screen of return feed from holographic display device 12 to provide a telepresence arrangement. In one example, image capturing system 18 includes a speaker (not shown) to play the audio of audiences to make it more interactive between subject 16 and audiences. Additionally, image capturing system 18 provides light box 154 for providing light 156 on subject 16 while recoding his still image or video by second camera 148. FIG. 13 shows an exemplary set-up of second camera 148, reference monitor 150, feed reference monitor 152, and light box 154, in accordance with one embodiment of the present invention.

In order to record still images or video of subject 16 by second camera 148 and present/display hologram-like image 14 on transparent monitor 58, at first, light box 154 projects light 156 onto subject 16, as shown on FIG. 11. In one implementation, subject 16 positions closer to sheet 140 and stands/places on platform 146. For example, if subject 16 is a human being, then subject 16 faces his back close to sheet 140 and stands on platform 146. Light 156 creates distant shadow 158 of subject 16 on sheet 140 and illuminates reflection 160 of subject 16 on platform 146. This helps to create shadow 158 of subject 16 behind them and helps to tie subject 16 to shadow 158. Similarly, platform 146 creates reflection 160 of subject 16 and helps to tie subject 16 to reflection 160. Second camera 148 captures image/video and/or sound of subject 16 together with shadow 158 and reflection 160. After capturing image data i.e., (image/video having shadow 158 and reflection 160 and sound) of subject 16, second camera 148 transmits the image data to holographic display device 12. A person skilled in the art appreciates that second camera 148 transmits the image data using wired or wireless protocols to holographic display device 12 via one of broadcast receiver 112, first interface 114, second interface 116, and communication interface 124. Signal separator 118 divides the image data into an image signal, an audio signal, and an additional information signal. Further, signal separator 118 transmits the image signal and the audio signal to A/V processor 120. A/V processor 12 decodes the image signal and outputs the image signal as hologram-like image 14 on transparent monitor 58 with the help of image signal provider 122. Simultaneously, A/V processor 12 decodes the audio signal and outputs the audio signal via speaker 70. This ensures that hologram-like image 14 of object 16 gets displayed on transparent monitor 58 and sound recorded using second camera 146 plays out via speaker 70 simultaneously.

Figure 14:
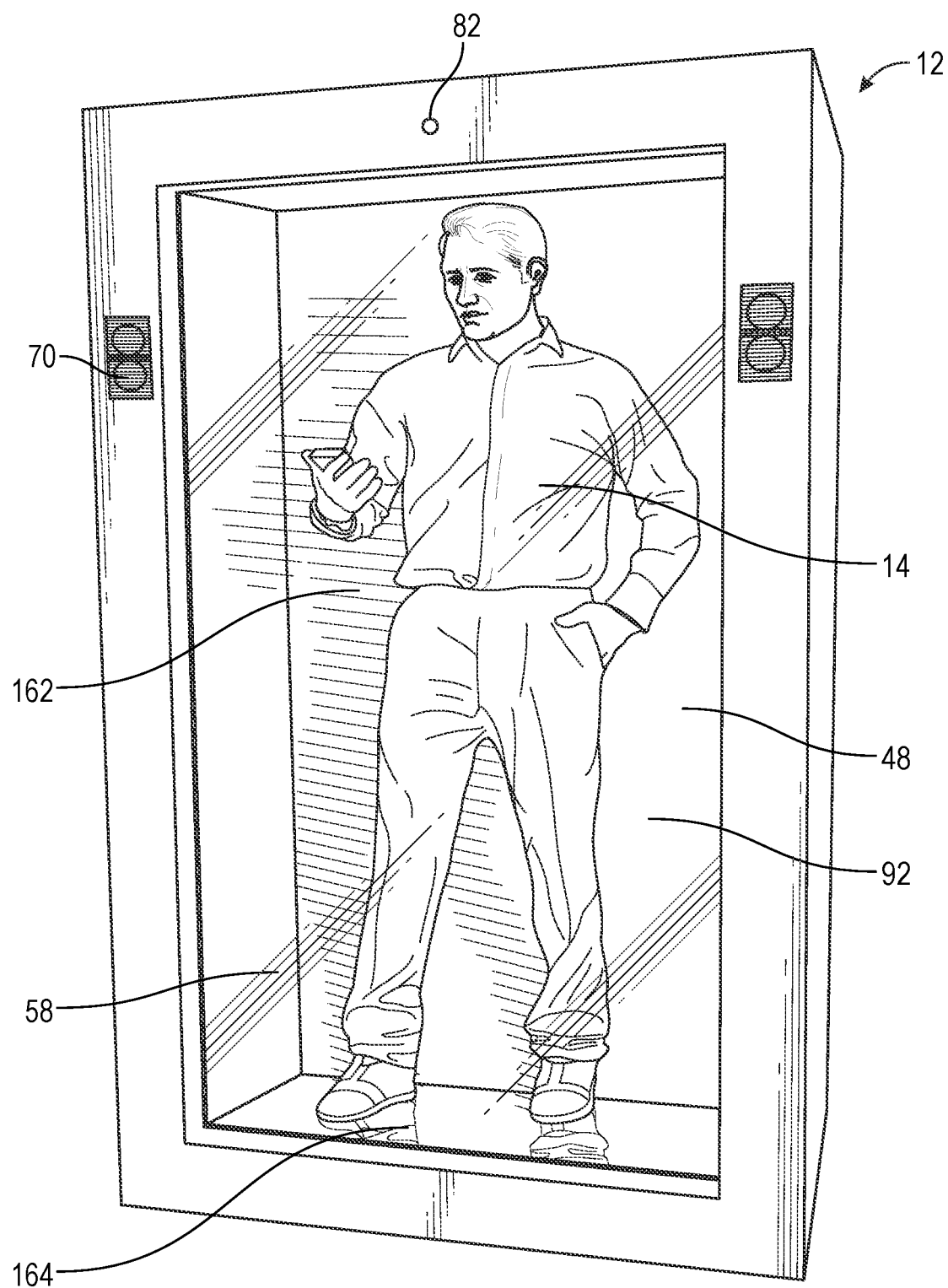
FIG. 14 shows the hologram-like image presented on the transparent monitor; and, FIG. 15, FIG. 16, FIG. 17, and FIG. 18 show a holographic display device having a triangular shape/configuration, in accordance with another embodiment of the present invention for placement of the holographic display device in a corner of a room.

As presented above, the positioning of light panels 36 enable interior 92 to be fully lit from the side, rear, and/or top of box 20. Further, translucent panel 48 (together with light panels 36) covering the rear, sides, top and bottom and transparent monitor 58 covering the front end form a three-dimensional (3D) interior lit display box. As such, hologram-like image 14 of object 16 gets displayed on transparent monitor 58. Further, shadow 158 and reflection 160 of object 16 get displayed as shadow 162 and reflection 164 on transparent monitor 58. FIG. 14 shows hologram-like image 14 having shadow 162 and reflection 164 displayed on transparent monitor 58, in accordance with one exemplary embodiment of the present invention. Light panels 36 produce bright light and translucent panel 48 evenly distributes and blends the light in interior 92. This creates maximum depth, dimension, and realistic effect for hologram-like image 14 displayed on transparent monitor 58. Hologram-like image 14 having shadow 162 and reflection 164 create a hologram effect when displayed on transparent monitor 58 with well-lit interior 92 as a backdrop in holographic display device 12. In other words, hologram-like image 14 having shadow 162 and reflection 164 provide a hologram effect with a more natural and realistic background. Configuring light panels 36 to provide maximum lumens helps to create a much brighter, crisper, and higher resolution hologram-like image. Further, providing translucent panel 48 with curvature C help to have curved/sloped/seamless interior 92 at the top and bottom. In other words, bottom translucent panel 50 presents curvature C where it connects rear translucent panel 54 and creates a seamless or continuous look making interior 92 more realistic background without any seam or line or edge from bottom translucent panel 50 to rear translucent panel 54. This allows to provide a much more realistic hologram effect of hologram-like image 14 when displayed on transparent monitor 58. Here, seamless curvature C at the top, bottom, and sides of translucent panel 48 allow hologram-like image 14 to appear more solid as the naked eye finds no seams or lines on translucent panel 48 (well-lit interior 92) through hologram-like image 14. In one example, monitor frame or bezel 60 design allows to push transparent monitor 58 back (i.e., allows transparent monitor 58 to be recessed) by approximately 3" to control viewing angle and enhance the hologram effect of hologram-like image 14 displayed on transparent monitor 58.

In one implementation, speakers 70 mount at approximately 5 feet from the ground. When hologram-like image or video 14 gets displayed on transparent monitor 58 simultaneously with sound playing via speakers 70, it enhances the realistic experience. Further, first camera 82 together with other electronic components help to capture motion, facial features and other aspects of objects or human being (audiences) present in front of holographic display device 12 using known techniques. First camera 82 transmits data captured to feed reference monitor 152 of image capturing system 18 to provide telepresence effect.

A person skilled in the art appreciates that image capturing system 18 helps to record image and sound of the object with (white and cyc) sheet 140 as background and/or platform 146 at the bottom. The recorded image gets transmitted in real-time or when needed to holographic display device 12 for displaying hologram-like image 16 on transparent monitor 58. As such, the recorded image gets transmitted to holographic display device 12 using wired or wireless protocols via a variety of electronic devices such as USB sticks, HDMI ports, cellular data (e.g., using a mobile phone), and so on.

The presently disclosed holographic display device 12 enables to live stream content (images or video with sound) recorded on-site or remotely. As such, holographic display device 12 helps to display pre-recorded content or live stream as the content gets recorded anywhere via the internet, satellite, or fibre optics transmission.

Further, holographic display device 12 allows users to transmit content (image or video and/or sound) and adjust lighting and other features using an application provided in their electronic devices (e.g., mobile phone) or a remote controller. Alternatively, input interface 126 allows the users to adjust settings of transparent monitor 58 and/or any component of holographic display device 12.

The presently disclosed holographic display device 12 provides an application for use in theatrical, educational, medical, museums, or other live event presentations. Further, the presently disclosed holographic display device 12 provides an application for use in advertising or other presentations that are intended to promote and/or extol the features and advantages of any product or service being offered for sale. Furthermore, the presently disclosed holographic display device 12 provides an application for use in presenting or displaying a virtual performance (of pre-recorded content) by a performer, even though the performer is no longer alive.

The holographic display device 12 comes in a variety of sizes and shapes. For example, holographic display device 12 comes with dimensions 7'×3'×2',7' being height, 3' being width and 2' being depth (thickness) for displaying hologram-like image 14 of a full-sized adult. However, a person skilled in art holographic display device 12 may come in a variety of shapes and sizes to display products of different sizes useful for advertising purposes.

Figure 15:
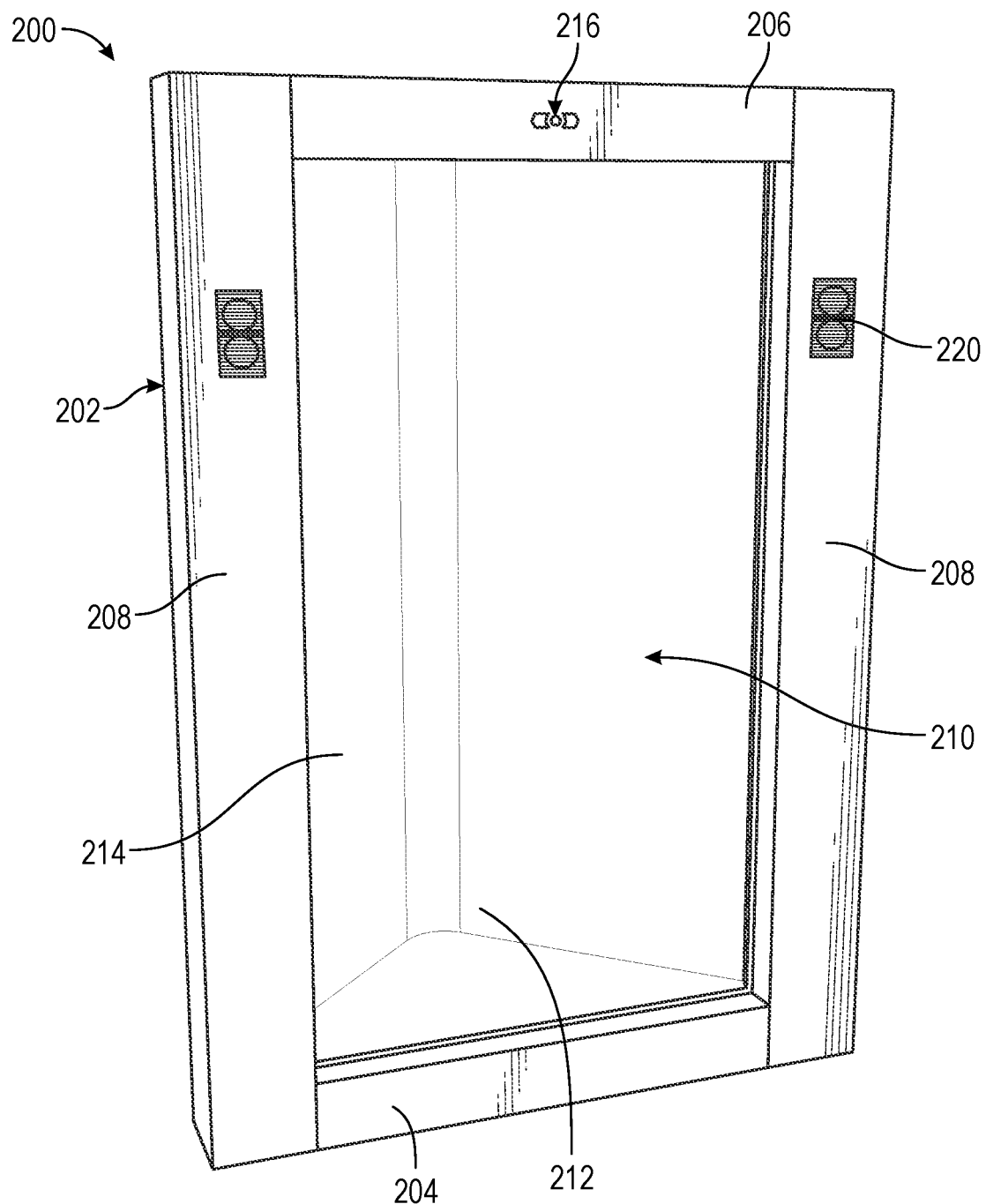

The above description explains rectangular-shaped holographic display device 12, in accordance with one embodiment of the present invention. FIGS. 15 through 18 show holographic display device 200 having triangular shape/configuration, in accordance with another embodiment of the present invention. Similarly, a person skilled in the art appreciates that the presently disclosed holographic display device may come in different shapes and sizes. FIG. 15 shows a perspective view of holographic display device 200. Holographic display device 200 presents box 202 in a triangular configuration. Box 202 comes in different shapes and sizes. For example, box 02 is big enough e.g., 6 to 7-foot-tall and 3-foot-wide to showcase a full-sized adult. In another example, box 202 comes in a smaller size say 1-2-foot-tall and 1-2 foot-wide to showcase smaller sized products. Box 202 presents bottom frame 204 (similar to bottom frame 22), top frame 206 (similar to top frame 28), and side frames 208 (similar to side frames 24;26). Each of bottom frame 204, side frames 208 and top frame 206 provides an L-shaped frame made of metal, hard plastic, or any other suitable material. Box 202 presents two side frames 208 at sides and the front presents transparent monitor 214 (similar to transparent monitor 58).

Figure 16:
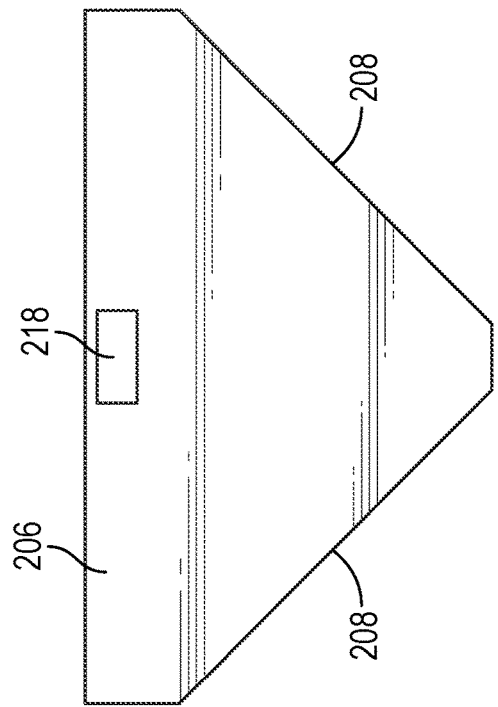

Box 202 encompasses light panels 210 at its sides, top, and rear. Further, box 202 encompasses translucent panel 212 (similar to translucent panel 48) to diffuse, blend and evenly distribute the high luminosity produced by light panels 210. In the present embodiment, top frame 206 encompasses camera 216 (similar to first camera 82) for recording images or video in its field of view i.e., front of box 202. Camera 216 mounts through camera mount 218 placed at top of top frame 206. FIG. 16 shows the top view of box 202 having camera mount 218. Further, side frames 208 encompasses speakers 220 at a suitable height from the ground to enhance the realistic experience of holographic display device 200.

Figure 17:
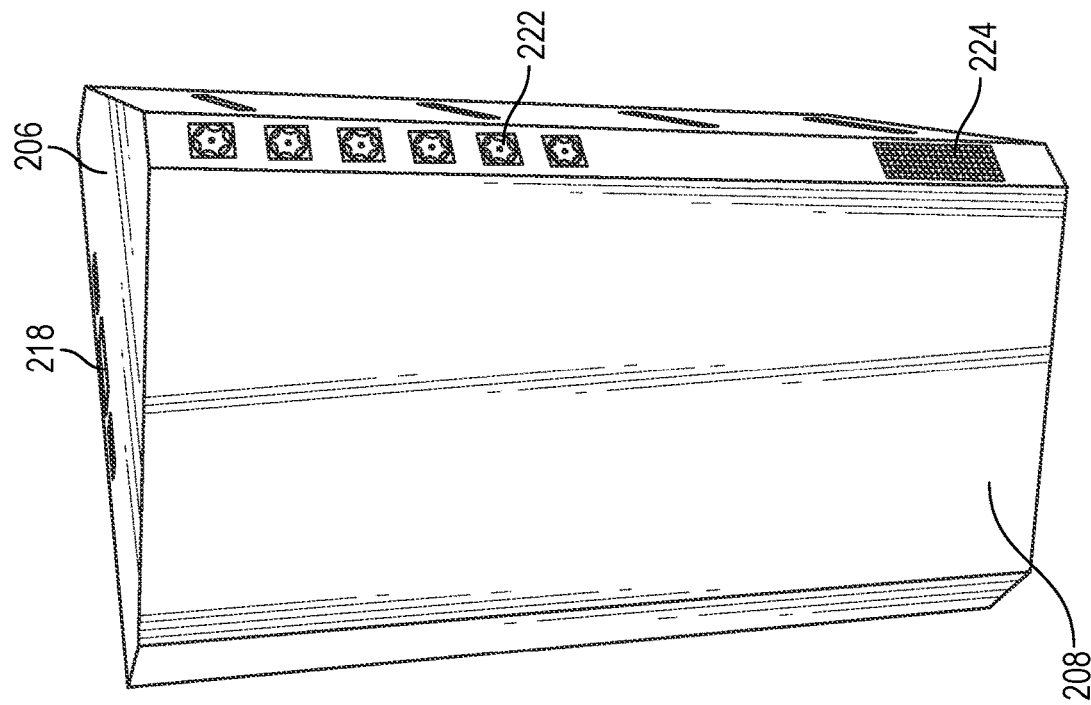
Figure 18:
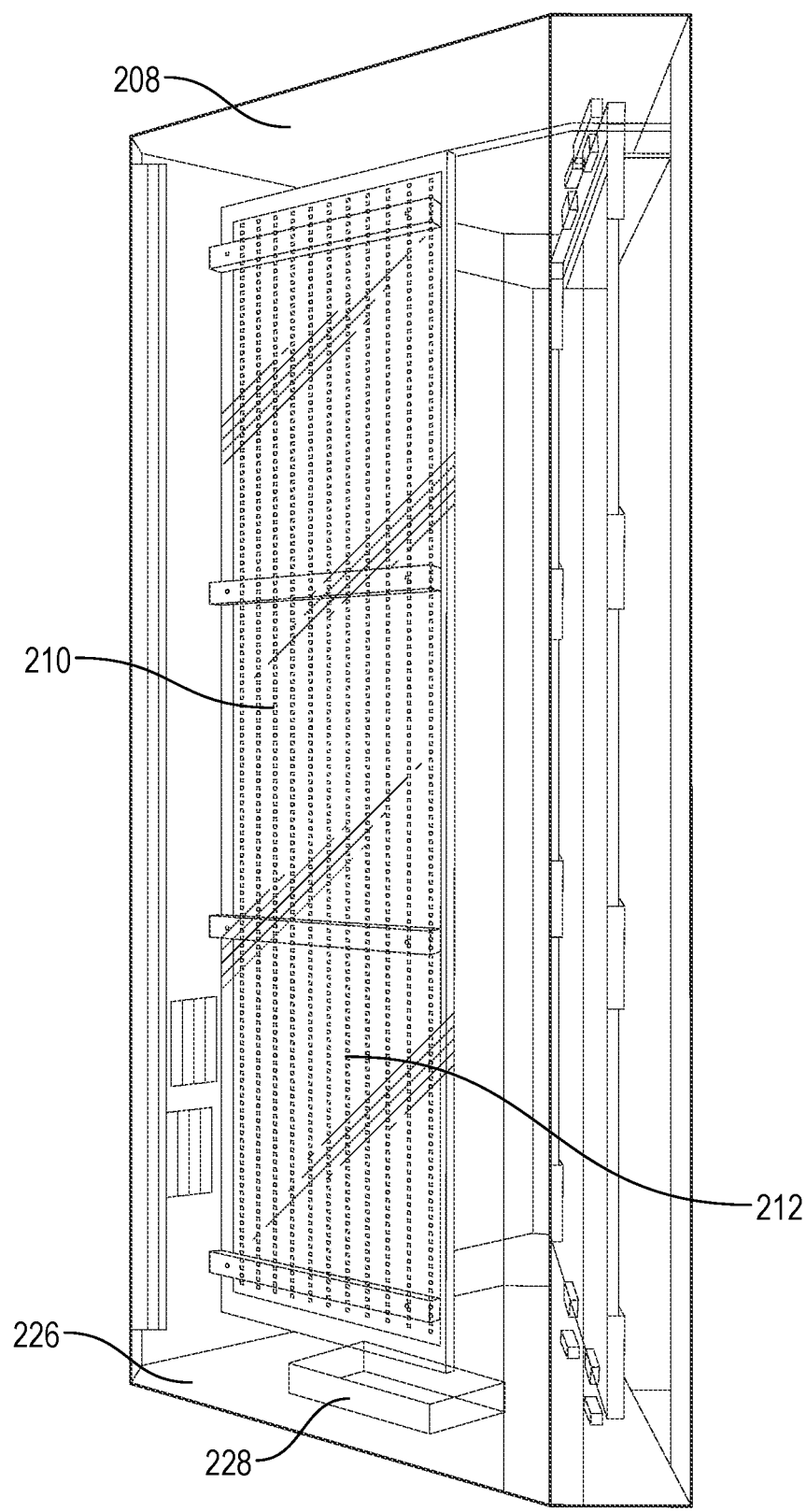

Further, box 202 presents fans 222 and vents 224 at side frames 208. Fans 222 and/or vents 224 blow out hot air generated by light panels 210. FIG. 17 shows a rear perspective view of holographic display device 200 having fans 222 and vents 224. FIG. 18 shows a side perspective view of holographic display device 200 showing light panels 210, deck 226 (similar to deck 80), and power supply mounting plate 228 (similar to power supply mounting plate 81).

Holographic display device 200 operates similar to holographic display device 12. Holographic display device 200 allows to place it in a corner of a room. In one example, a larger room or building such as a shopping complex houses one or more holographic display devices 12 and/or holographic display device 200. One or more holographic display devices 12 position at centre of the room and one or more holographic display device 200 position at corners of the room to enhance the visual experience for viewers or audiences.

Although the above description explains recording images or videos using the image capturing system 18 setups, a person skilled in the art understands that it is possible to capture images or videos using known electronic devices such as a mobile phone or digital camera. Subsequently, the mobile phone transmits the images to the holographic display device 12; 200 to display the hologram-like image on a transparent monitor. Similarly, users capture images using a variety of devices and transmit them to the holographic display device for displaying on the transparent monitor without deviating from the scope of the present invention.

The embodiments of the present invention described above provide several advantages over the prior art. For example, the present invention presents a hologram-like image effect within a holographic display device when the right content i.e., image is presented on a transparent monitor. The hologram-like image with shadow in its background and reflection at the bottom provides a more realistic and natural-looking content/image. Providing the right amount of light inside the interior allows adjusting depth, dimension, and realistic effect of the hologram-like image displayed on a transparent monitor. Further, the monitor frame allows to push transparent monitor back to control the viewing angle and enhance the three-dimensional (3D) effect of the hologram-like image. In addition, the seamless translucent panel allows the hologram-like image to appear more solid and provides a more realistic hologram illusion.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A holographic display device for presenting a hologram-like image, said holographic display device comprising:
    a box-like structure;
    a plurality of translucent panels comprising a rear translucent panel, a bottom translucent panel, a top translucent panel, and side translucent panels;
    wherein said bottom translucent panel is seamless with, and curves into said rear translucent panel;
    wherein said rear translucent panel and said side panels extend substantially an entire vertical length of said box-like structure;
    a plurality of light panels comprising a rear light panel, and side light panels, wherein said plurality of light panels extend substantially an entire vertical length of said box-like structure, wherein said plurality of light panels are positioned between said box-like structure and said plurality of translucent panels; and, a transparent monitor connecting said box-like structure at its front end, wherein said transparent monitor and said plurality of translucent panels form an interior for said box-like structure, wherein said transparent monitor receives and displays an image, wherein said plurality of light panels illuminate lights and said plurality of translucent panels diffuses, blends and evenly distributes the light in the interior for presenting the image displayed on said transparent monitor as a hologram-like image; and, whereby hologram-like images displayed on said transparent monitor appear more realistic when said plurality of light panels illuminate said plurality of translucent panels having a seamless curvature between said bottom translucent light panel and said rear translucent panel.

2. The holographic display device of claim 1, wherein said plurality of translucent panels are made of an acrylic material.

3. The holographic display device of claim 1, further comprises a monitor frame surrounding said transparent monitor, wherein said monitor frame controls a viewing angle for the image displayed on said transparent monitor.

4. The holographic display device of claim 3, wherein said monitor frame recesses inwards at of a depth of approximately three inches, thereby enhancing the effect for the hologram-like image of the image displayed on said transparent monitor by controlling the viewing angle for the image displayed on said transparent monitor.

5. The holographic display device of claim 1, wherein said transparent monitor receives the image from an image source, wherein the image source situates at a location different from said holographic display device.

6. The holographic display device of claim 1, wherein the image source is an electronic device comprising one of a mobile phone, a digital camera, a laptop, and a desktop.

7. The holographic display device of claim 6, further comprises a camera connecting said box-like structure, wherein said camera captures a field of view of the holographic display device and allows for transmission to the image source, and wherein capturing the field of view facilitates a real-time interaction between the holographic display device and the image source.

8. The holographic display device of claim 1, further comprises speakers connecting said box-like structure, wherein speakers output audio simultaneously with the image displayed on the transparent monitor for presenting an interactive experience.

9. The holographic display device of claim 1, wherein the plurality of light panels comprises at least 11 light-emitting diode (LED) strips.

10. A system for capturing an image of a subject and presenting a hologram-like image corresponding to the image, the system comprising:
an image capturing system, comprising:
a sheet;
a camera for capturing an image of a subject with the sheet acting as a background for the subject,
wherein the image capturing system transmits the image to a holographic display device, and
said holographic display device comprising:
a box-like structure;
a plurality of translucent panels comprising a rear translucent panel, a bottom translucent panel, a top translucent panel, and side translucent panels;
wherein said bottom translucent panel is seamless with, and curves into said rear translucent panel;
wherein said rear translucent panel and said side translucent panels extend substantially an entire vertical length of said box-like structure;
a plurality of light panels comprising a rear light panel, and side light panels, where said plurality of light panels extend substantially an entire vertical length of said box-like structure, wherein said plurality of light panels are positioned between said box-like structure and said plurality of translucent panels; and,
a transparent monitor connecting said box-like structure at its front end, wherein said transparent monitor and said plurality of translucent panels form an interior for said box-like structure,
wherein said transparent monitor receives and displays an image, wherein said light panels illuminate lights and said translucent panel diffuses, blends and evenly distributes the light in the interior for presenting the image displayed on said transparent monitor as a hologram-like image; and,
whereby hologram-like images displayed on said transparent monitor appear more realistic when said plurality of light panels illuminate said plurality of translucent panels having a seamless curvature between said bottom translucent panel and said rear translucent panel.

11. The system of claim 10, further comprising a platform for positioning the subject, wherein the platform reflects a lower portion of the subject.

12. The system of claim 11, further comprises a light source for illuminating light onto the subject for forming a shadow of the subject on the sheet.

13. The system of claim 12, wherein said camera captures the image of the subject, the shadow and the reflection created by the platform.

14. The system of claim 10, further comprises a second camera connecting said box-like structure, wherein said camera captures a field of view of the holographic display device and allows for transmission to the image capturing system.

15. The system of claim 10, wherein the image capturing system comprises a feed reference monitor configured for receiving and displaying information captured in the field of view of the holographic display device to the subject, and wherein displaying the information corresponding to the field of view facilitates a real-time interaction between the holographic display device and the subject.

16. The system of claim 10, wherein the image capturing system transmits the image to the holographic display device using a wired or wireless protocol.

17. A method of presenting a hologram-like image, said method comprising:
providing a box-like structure;
providing a plurality of translucent panels, said plurality of translucent panels comprises a rear translucent panel, a bottom translucent panel, a top translucent panel, and side translucent panels, wherein said bottom translucent panel is seamless with, and curves into said rear translucent panel;
providing a plurality light panels between said box-like structure and said plurality of translucent panels, wherein said plurality of light panels extend entire vertical length of said box-like structure;
providing a transparent monitor connecting said box-like structure;
forming an interior with said transparent monitor and said plurality of translucent panels for said box-like structure;

receiving an image for displaying on said transparent monitor;

illuminating light in the interior using said plurality of light panels;

diffusing, blending and evenly distributing the light in the interior through the plurality of translucent panels; and, presenting the image displayed on the transparent monitor as a hologram-like image with well-lit interior.

18. The method of claim 17, further comprising:

illuminating light onto a subject and forming a shadow of the subject on a sheet;

transmitting the image of the subject, the shadow of the subject on the sheet to the transparent monitor, wherein the shadow of the subject appears to be displayed on the rear translucent panel and bottom translucent panel when the shadow of the subject is actually displayed on transparent monitor, thereby giving an added realistic effect of the hologram-like image; and, wherein the image received is pre-recorded or provided in real-time.

\* \* \* \* \*